United States Patent
Erivantcev et al.

(10) Patent No.: US 10,521,011 B2
(45) Date of Patent: Dec. 31, 2019

(54) CALIBRATION OF INERTIAL MEASUREMENT UNITS ATTACHED TO ARMS OF A USER AND TO A HEAD MOUNTED DEVICE

(71) Applicant: Finch Technologies Ltd., Road Town, Tortola (VG)

(72) Inventors: Viktor Vladimirovich Erivantcev, Ufa (RU); Ravil Salavatovich Shafikov, Kumertau (RU); Alexander Sergeevich Lobanov, Ufa (RU); Iakov Evgenevich Sergeev, Ufa (RU); Alexey Ivanovich Kartashov, Moscow (RU); Daniil Olegovich Goncharov, Ufa (RU)

(73) Assignee: FINCH TECHNOLOGIES LTD., Fish Bay, Tortola (VG)

( * ) Notice: Subject to any disclaimer, the term of this patent is extended or adjusted under 35 U.S.C. 154(b) by 33 days.

(21) Appl. No.: 15/847,669

(22) Filed: Dec. 19, 2017

(65) Prior Publication Data
US 2019/0187784 A1   Jun. 20, 2019

(51) Int. Cl.
*G06F 3/01* (2006.01)
*G06T 7/70* (2017.01)

(52) U.S. Cl.
CPC ............... *G06F 3/012* (2013.01); *G06T 7/70* (2017.01); *G06T 2207/10016* (2013.01); *G06T 2207/30204* (2013.01)

(58) Field of Classification Search
CPC . G06F 3/012; G06F 3/011; G06T 7/70; G06T 2207/30204; G06T 2207/10016;
(Continued)

(56) References Cited

U.S. PATENT DOCUMENTS 8,187,100 B1  5/2012  Kahn et al.
8,933,886 B2 * 1/2015  Imoto ............... G06F 3/013
                                                 345/158
(Continued)

FOREIGN PATENT DOCUMENTS

| CN | 103226398 | 7/2013 |
| WO | 2016183812 | 11/2016 |
| WO | 2016209819 | 12/2016 |

OTHER PUBLICATIONS

Accessories for Vive, retrieved from https://www.vive.com/us/accessory/ on Jan. 30, 2017.
(Continued)

*Primary Examiner* — Vinh T Lam
(74) *Attorney, Agent, or Firm* — Greenberg Traurig, LLP

(57) ABSTRACT

A system including: a sensor module having an inertial measurement unit and attached to the head of a user. The sensor module is initially calibrated to measure its orientation relative a reference pose. To recalibrate the sensor module according to a calibration pose, a camera of the sensor module is used to capture an image of at least one optical mark (e.g., configured on devices held in hands in the calibration pose in front of the user). A direction identified from the image is rotated according to the rotational transformation between the reference pose and the calibration pose measured by the sensor module and then projected on to a horizontal plane relative to the reference pose. The angle in the horizontal plane between the projected direction and the front facing direction is used for the calibration of the subsequent orientation measurements of the sensor module.

20 Claims, 8 Drawing Sheets

(58) Field of Classification Search
CPC .......... G01P 21/00; G01P 15/18; G01P 15/08; G01P 15/14

See application file for complete search history.

(56) References Cited

U.S. PATENT DOCUMENTS

| | | | | |
|---|---|---|---|---|
| 8,988,438 | B2* | 3/2015 | Bang | G06K 9/00342 |
| | | | | 345/420 |
| 9,141,194 | B1 | 9/2015 | Keyes et al. | |
| 9,278,453 | B2 | 3/2016 | Assad | |
| 9,405,372 | B2 | 8/2016 | Yen et al. | |
| D772,986 | S | 11/2016 | Chen et al. | |
| 9,504,414 | B2* | 11/2016 | Coza | G06F 3/011 |
| 9,600,925 | B2 | 3/2017 | Katz et al. | |
| 9,891,718 | B2 | 2/2018 | Connor | |
| 9,996,945 | B1* | 6/2018 | Holzer | G06K 9/00671 |
| 10,019,806 | B2* | 7/2018 | Perry | H04N 5/23229 |
| 2003/0142065 | A1 | 7/2003 | Pahlavan | |
| 2007/0050597 | A1 | 3/2007 | Ikeda | |
| 2007/0273610 | A1* | 11/2007 | Baillot | G02B 27/017 |
| | | | | 345/8 |
| 2008/0088468 | A1 | 4/2008 | Kim | |
| 2009/0322763 | A1 | 12/2009 | Bang et al. | |
| 2010/0079466 | A1* | 4/2010 | Griffin | G06K 9/00335 |
| | | | | 345/473 |
| 2011/0161804 | A1 | 6/2011 | Park et al. | |
| 2012/0025945 | A1 | 2/2012 | Yazadi et al. | |
| 2012/0130203 | A1 | 5/2012 | Stergiou et al. | |
| 2012/0214591 | A1 | 8/2012 | Ito et al. | |
| 2012/0293410 | A1 | 11/2012 | Bell | |
| 2014/0028547 | A1 | 1/2014 | Bromley et al. | |
| 2014/0201689 | A1 | 7/2014 | Bedikian et al. | |
| 2014/0313022 | A1 | 10/2014 | Moeller et al. | |
| 2015/0062086 | A1 | 3/2015 | Nattukallingal | |
| 2015/0077347 | A1 | 3/2015 | OGreen | |
| 2015/0145860 | A1* | 5/2015 | Craig | G06K 9/00369 |
| | | | | 345/419 |
| 2015/0145985 | A1* | 5/2015 | Gourlay | G06T 17/00 |
| | | | | 348/135 |
| 2015/0277559 | A1 | 10/2015 | Vescovi et al. | |
| 2015/0358543 | A1 | 12/2015 | Kord | |
| 2016/0005232 | A1 | 1/2016 | Quarles | |
| 2016/0054797 | A1 | 2/2016 | Tokubo et al. | |
| 2016/0077608 | A1 | 3/2016 | Nakasu et al. | |
| 2016/0187969 | A1* | 6/2016 | Larsen | G06F 3/012 |
| | | | | 345/156 |
| 2016/0306431 | A1 | 10/2016 | Stafford et al. | |
| 2016/0313798 | A1 | 10/2016 | Connor | |
| 2016/0378204 | A1 | 12/2016 | Chen et al. | |
| 2017/0053454 | A1 | 2/2017 | Katz et al. | |
| 2017/0083084 | A1 | 3/2017 | Tatsuta et al. | |
| 2017/0115728 | A1* | 4/2017 | Park | G02B 27/0093 |
| 2017/0147066 | A1 | 5/2017 | Katz et al. | |
| 2017/0186226 | A1 | 6/2017 | Cashman et al. | |
| 2017/0308165 | A1 | 10/2017 | Erivantcev et al. | |
| 2017/0352188 | A1 | 12/2017 | Levitt | |
| 2018/0095637 | A1* | 4/2018 | Valdivia | H04L 51/16 |
| 2018/0101989 | A1* | 4/2018 | Frueh | G06F 16/5838 |
| 2018/0165879 | A1* | 6/2018 | Holzer | G06T 19/006 |
| 2018/0217680 | A1* | 8/2018 | Sudou | G06F 3/0481 |
| 2018/0225517 | A1* | 8/2018 | Holzer | G06K 9/00718 |
| 2018/0253142 | A1* | 9/2018 | Tsuchie | G06F 3/0487 |
| 2018/0313867 | A1 | 11/2018 | Erivantcev et al. | |
| 2018/0335834 | A1 | 11/2018 | Erivantcev et al. | |
| 2018/0335843 | A1 | 11/2018 | Erivantcev et al. | |
| 2018/0335855 | A1 | 11/2018 | Erivantcev et al. | |

OTHER PUBLICATIONS

Daydream, retrieved from https://vr.google.com/daydream/ on Jan. 30, 2017.

Forward kinematics, Wikipedia, retrieved from https://en.wikipedia.org/wiki/Forward_kinematics on Sep. 21, 2017.

Gest—Work with your hands. Wayback Machine 2016. Retrieved from https://web.archive.org/web/20160304012247/https://gest.co/ on Jan. 30, 2017.

Gloveone: Feel Virtual Reality. Wayback Machine 2016. Retrieved from https://web.archive.org/web/20160307080001/https://www.gloveonevr.com/ on Jan. 30, 2017.

International Application No. PCT/US2017/028982, International Search Report and Written Opinion, Aug. 24, 2017.

Manus VR—The Pinnacle of Virtual Reality Controllers, Manus VR Development Kit Pro Q4 2016.

Manus VR—The virtual reality dataglove for consumers. Wayback Machine 2016. Retrieved from https://web.archive.org/web/20160417035626/https://manusvr. com/ on Jan. 30, 2017.

NeuroDigital: The VR Technology Factory, retrieved from https://www.neurodigital.es/ on Jan. 30, 2017.

Oculus Rift | Oculus. Retrieved from https://www3.oculus.com/enus/ rift/ on Jan. 30, 2017.

RevolVR Virtual Reality Controllers, retrieved from http://revolvr.co/ on Jan. 30, 2017.

Wireless Gaming Controllers for PC, Mac, and Mobile = SteelSeries, retrieved from https://steelseries.com/gamingcontrollers on Jan. 30, 2017.

Xbox Wireless Controller, retrieved from http://www.xbox.com/en-US/xbox-one/accessories/controllers/xbox-wireless-controller on Jan. 30, 2017.

Devices for Controlling Computers Based on Motions and Positions of Hands, U.S. Appl. No. 15/492,915, filed Apr. 20, 2017, Viktor Erivantcev, et al, Non Final Action, dated Apr. 18, 2018.

Calibration of Inertial Measurement Units Attached to Arms of a User to Generate Inputs for Computer Systems, U.S. Appl. No. 15/817,646, filed Nov. 20, 2017, Viktor Erivantcev, et al, Docketed New Case—Ready for Examination, dated Jan. 10, 2018.

Tracking Arm Movements to Generate Inputs for Computer Systems, U.S. Appl. No. 15/787,555, filed Oct. 18, 2017, Viktor Erivantcev, et al, Docketed New Case—Ready for Examination, dated Jan. 9, 2018.

Tracking Finger Movements to Generate Inputs for Computer Systems, U.S. Appl. No. 15/792,255, filed Oct. 24, 2017, Viktor Erivantcev, et al, Docketed New Case—Ready for Examination, dated Jan. 9, 2018.

Tracking Torso Orientation to Generate Inputs for Computer Systems, U.S. Appl. No. 15/813,813, filed Nov. 15, 2017, Viktor Erivantcev, et al, Docketed New Case—Ready for Examination, dated Jan. 17, 2018.

Correction of Accumulated Errors in Inertial Measurement Units Attached to a User, U.S. Appl. No. 15/868,745, filed Jan. 11, 2018, Viktor Erivantcev, et al, Docketed New Case—Ready for Examination, dated Mar. 2, 2018.

Tracking Torso Leaning to Generate Inputs for Computer Systems, U.S. Appl. No. 15/864,860, filed Jan. 8, 2018, Viktor Erivantcev, et al, Docketed New Case—Ready for Examination, dated Feb. 12, 2018.

Camera Calibration and 3D Reconstruction, OpenCV 2.4.13.6 documentation, https://docs.opencv.org/2.4/modules/calib3d/doc/camera_calibration_and_3d_reconstruction.html, printed on Jun. 11, 2018.

Forward kinematics, Wikipedia, printed on Sep. 21, 2017.

Stereo camera, Wikipedia, printed on Jun. 29, 2018.

\* cited by examiner

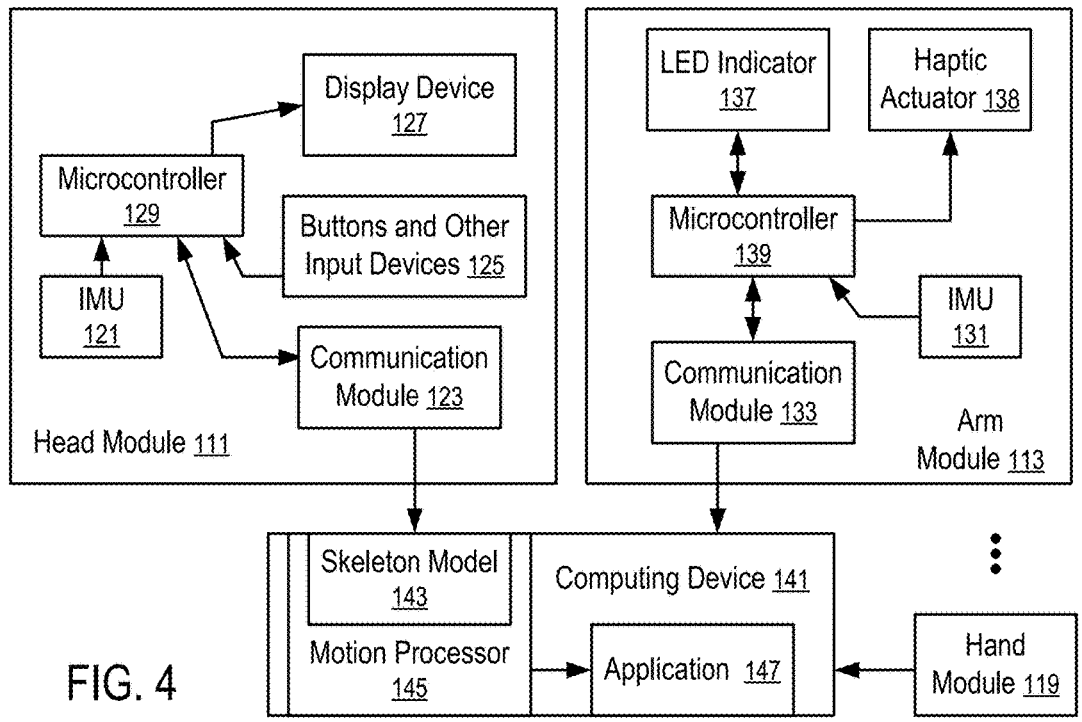
FIG. 4
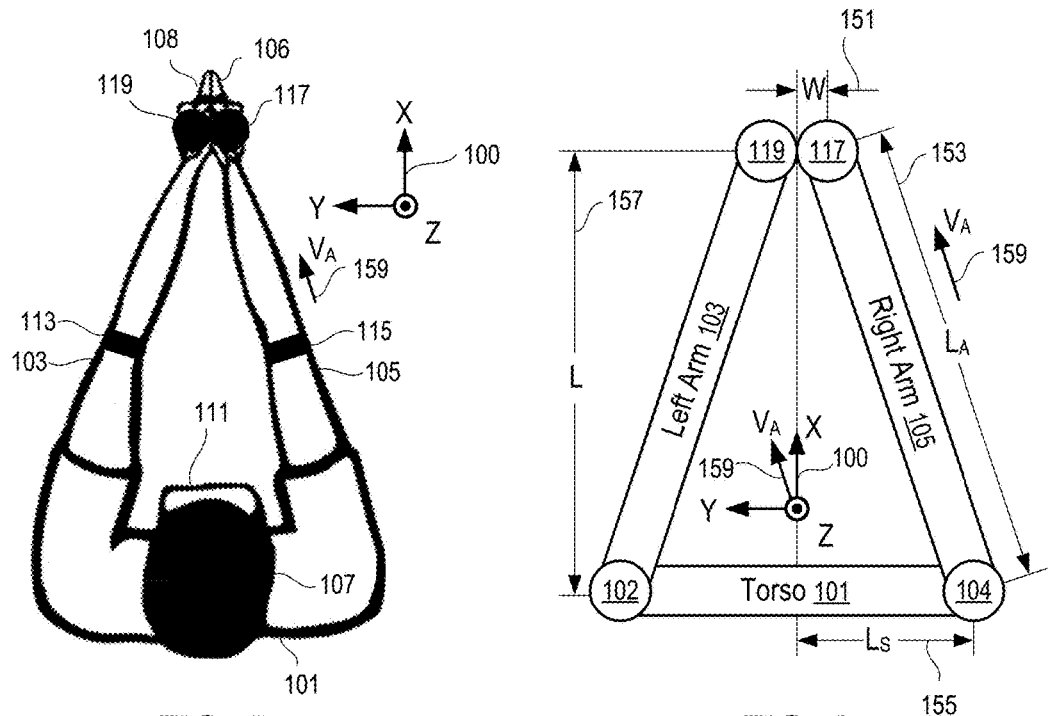
FIG. 5
FIG. 6

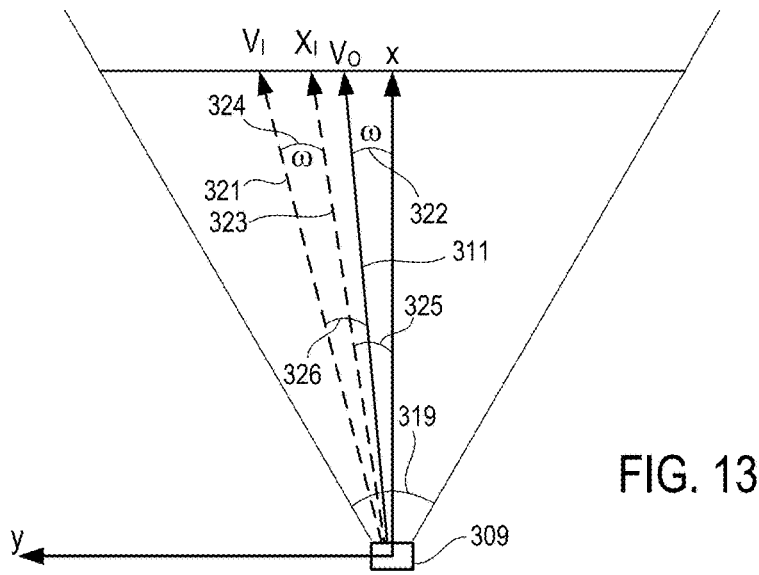

FIG. 13

```
┌─────────────────────────────────────────────────┐
│ Receive an measurement of the orientation of a  │
│ sensor module attached to a head mounted device │
│ of a user in a calibration pose relative to a   │
│ reference pose  331                             │
└─────────────────────────────────────────────────┘
                         ↓
┌─────────────────────────────────────────────────┐
│ Identify a first direction of the sensor module │
│ in the reference pose that is expected to be    │
│ rotated to a front facing direction at the      │
│ calibration pose  333                           │
└─────────────────────────────────────────────────┘
                         ↓
┌─────────────────────────────────────────────────┐
│ Apply a first rotation, identified by the       │
│ measurement of the orientation of the sensor    │
│ module, to the first direction to obtain a      │
│ second direction at the calibration pose  335   │
└─────────────────────────────────────────────────┘
                         ↓
┌─────────────────────────────────────────────────┐
│ Determine a second rotation between the front   │
│ facing direction at the reference pose and a    │
│ projection of the second direction in a         │
│ horizontal plane  337                           │
└─────────────────────────────────────────────────┘
                         ↓
┌─────────────────────────────────────────────────┐
│ Calibrate subsequent orientation measurements   │
│ of the sensor module using the second rotation  │
│ 339                                             │
└─────────────────────────────────────────────────┘
```

CALIBRATION OF INERTIAL MEASUREMENT UNITS ATTACHED TO ARMS OF A USER AND TO A HEAD MOUNTED DEVICE

RELATED APPLICATIONS

The present application relates to U.S. patent application Ser. No. 15/817,646, filed Nov. 20, 2017 and entitled "Calibration of Inertial Measurement Units Attached to Arms of a User to Generate Inputs for Computer Systems," which claims the benefit of the filing date of Prov. U.S. Pat. App. Ser. No. 62/491,909, filed Apr. 28, 2017 and entitled "Calibration of 3-D Object Models based on Fixed IMU Sensors". The present application also relates to U.S. patent application Ser. No. 15/813,813, filed Nov. 15, 2017 and entitled "Tracking Torso Orientation to Generate Inputs for Computer Systems", which claims the benefit of the filing date of Prov. U.S. Pat. App. Ser. No. 62/507,090, filed May 16, 2017. The present application also relates to U.S. patent application Ser. No. 15/792,255, filed Oct. 24, 2017 and entitled "Tracking Finger Movements to Generate Inputs for Computer Systems", and U.S. patent application Ser. No. 15/787,555, filed Oct. 18, 2017 and entitled "Tracking Arm Movements to Generate Inputs for Computer Systems", both claim the benefit of the filing date of Prov. U.S. Pat. App. Ser. No. 62/507,085, filed May 16, 2017. The present application also relates to U.S. patent application Ser. No. 15/492,915, filed Apr. 20, 2017 and entitled "Devices for Controlling Computers based on Motions and Positions of Hands", which claims the benefit of the filing dates of 62/325,925, filed Apr. 21, 2016 and entitled "Hand-Worn Devices for Controlling Computers based on Motions and Positions of Hands and Fingers", Prov. U.S. Pat. App. Ser. No. 62/463,183, filed Feb. 24, 2017 and entitled "Devices for Controlling Computers based on Motions and Positions of Hands and Arms," Prov. U.S. Pat. App. Ser. No. 62/463,209, filed Feb. 24, 2017 and entitled "Devices for Controlling Computers based on Motions and Positions of Hands," Prov. U.S. Pat. App. Ser. No. 62/463,252, filed Feb. 24, 2017 and entitled "Devices for Controlling Computers based on Motions and Positions of Hands and Arms." The entire disclosures of the above-referenced related applications are hereby incorporated herein by reference.

FIELD OF THE TECHNOLOGY

The embodiments disclosed herein relate to computer input devices in general and more particularly but not limited to input devices for virtual reality and/or augmented/mixed reality applications implemented using computing devices, such as mobile phones, smart watches, similar mobile devices, and/or other devices.

BACKGROUND

U.S. Pat. App. Pub. No. 2014/0028547 discloses a user control device having a combined inertial sensor to detect the movements of the device for pointing and selecting within a real or virtual three-dimensional space.

U.S. Pat. App. Pub. No. 2015/0277559 discloses a finger-ring-mounted touchscreen having a wireless transceiver that wirelessly transmits commands generated from events on the touchscreen.

U.S. Pat. App. Pub. No. 2015/0358543 discloses a motion capture device that has a plurality of inertial measurement units to measure the motion parameters of fingers and a palm of a user.

U.S. Pat. App. Pub. No. 2007/0050597 discloses a game controller having an acceleration sensor and a gyro sensor. U.S. Pat. No. D772,986 discloses the ornamental design for a wireless game controller.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

U.S. Pat. No. 9,600,925 and U.S. Pat. App. Pub. No. 2017/0053454 disclose calibration techniques for a virtual reality system using calibration data from an imaging device and calibration data from an inertial measurement unit on a virtual reality headset.

U.S. Pat. App. Pub. No. 2016/0378204 discloses a system to track a handheld device for a virtual reality environment using sensor data of the handheld device and the camera data of a head mounted display.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

FIG. 4 illustrates a system to control computer operations according to one embodiment.

FIG. 5 illustrates a pose of a user to calibrate inertial measurement units attached to the arms of a user.

FIG. 6 illustrates a skeleton model for the calibration according to the user pose of FIG. 5.

FIG. 13 illustrates the determination of a direction from an image for the calibration of the front facing direction of a head mounted device.

FIG. 14 shows a method to calibrate the front facing direction of a head mounted device according to one embodiment.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least some embodiments disclosed herein allow the determination of the deviation of the measurement space of a sensor device from a reference coordinate system using a convenient pose of a user wearing the sensor device on arms of the user.

Figure 1:
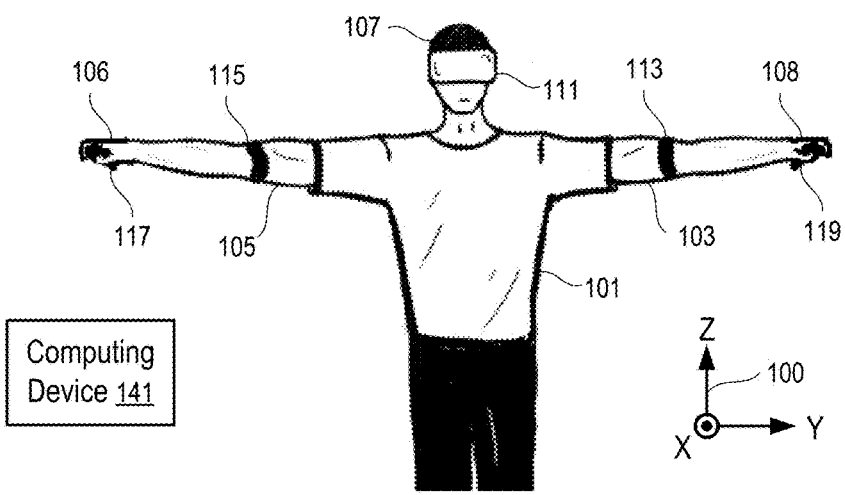
FIG. 1 illustrates a system to track movements of a user according to one embodiment.

FIG. 1 illustrates a system to track movements of a user according to one embodiment.

In FIG. 1, a user wears a number of sensor devices (111, 113, 115, 117 and 119). Each of the sensor devices (111-119) has an inertial measurement unit (IMU) to determine its orientation. Thus, the sensor devices (111-119) track the orientations of portions of user that are movable relative to the torso (101) of the user and relative to each other, such as the head (107), the upper arms (103 and 105), and the hands (106 and 108).

The sensor devices (111-119) communicate their movement/orientation measurements to a computing device (141), e.g., to control gesture input and/or an avatar of the user in a virtual reality, mixed reality, or augmented reality application in the computing device (141).

Typically, the measurements of the sensor devices (111-119) are calibrated for alignment with a common reference system, such as a coordinate system (100).

In FIG. 1, the coordinate system (100) is aligned with a number of directions relative to the user when the user is in the reference pose illustrated in FIG. 1. The direction Z is parallel to the vertical direction from the feet of the user to the head (107) of the user; the direction Y is parallel to the sideway direction from one hand (106) of the user to another hand (108) of the user; and the direction X is parallel to the front-back direction relative to the torso (101) of the user in the reference pose.

Figure 2:
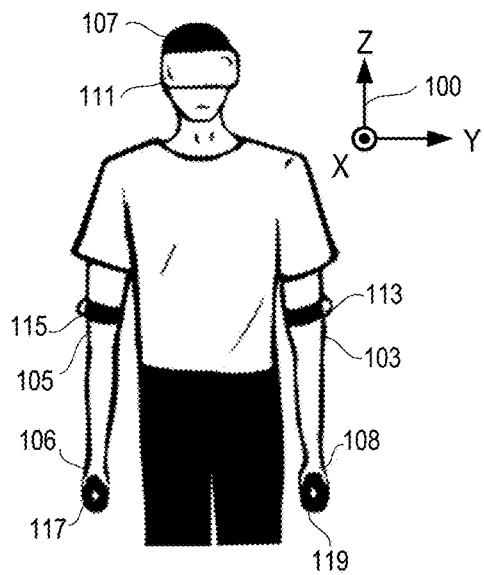
FIGS. 2 and 3 illustrate examples user poses that may be combined to calibrate inertial measurement units attached to the arms of a user.
Figure 3:
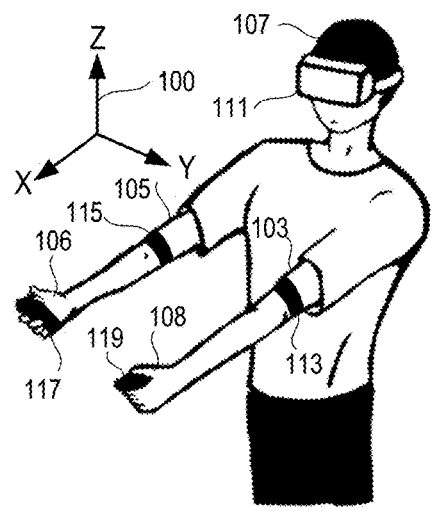

The directions X, Y and Z can be identified to the computing device (141) via combinations of reference poses, such as the poses illustrated in FIGS. 1-3.

When in the reference pose illustrated in FIG. 1, the arms (103 and 105) of the user extends horizontally in the sideways, in alignment with the direction Y of the coordinate system (100).

When in the reference pose illustrated in FIG. 2, the arms (103 and 105) of the user extends vertically in alignment with the direction Z of the coordinate system (100).

When in the reference pose illustrated in FIG. 3, the arms (103 and 105) of the user extends forwards and horizontally, in alignment with the direction X of the coordinate system (100).

From the pose of FIG. 1 to the pose of FIG. 2, the arms (103 and 105) of the user rotate along the direction X. Thus, by comparing the orientations of the sensor devices (113-119) that rotate with the arms (103 and 105) along the direction X from the pose of FIG. 1 to the pose of FIG. 2, the computing device (141) computes the direction X in the measurement spaces of the sensor devices (113-119).

From the pose of FIG. 2 to the pose of FIG. 3, the arms (103 and 105) of the user rotate along the direction Y. Thus, by comparing the orientations of the sensor devices (113-119) that rotate with the arms (103 and 105) along the direction Y from the pose of FIG. 2 to the pose of FIG. 3, the computing device (141) computes the direction Y in the measurement spaces of the sensor devices (113-119).

From the pose of FIG. 3 to the pose of FIG. 1, the arms (103 and 105) of the user rotate along the direction Z. Thus, by comparing the orientations of the sensor devices (113-119) that rotate with the arms (103 and 105) along the direction Z from the pose of FIG. 3 to the pose of FIG. 1, the computing device (141) computes the direction Z in the measurement spaces of the sensor devices (113-119).

Further, the direction Z can be computed as a direction orthogonal to the directions X and Y in a three dimensional space; the direction Y can be computed as a direction orthogonal to the directions X and Z in the three dimensional space; and the direction X can be computed as a direction orthogonal to the directions Y and Z in the three dimensional space.

Thus, from the measured orientations of the sensor devices (113-119) in the three reference poses illustrated in FIGS. 1-3, the computing device computes the relative orientation change between the reference coordinate system (100) and the measurement space of each of the sensor devices (113-119). Subsequently, the relative rotation can be used to calibration the corresponding one of the sensor devices (113-119) such that the calibrated orientation measurements relative to the common reference coordinate system (100).

The head sensor (111) can also be calibrated to produce measurements relative to the common reference coordinate system (100). For example, the average of the orientations of the head sensor (111) in the reference poses of FIGS. 1-3, or one of the orientations, can be considered as a reference orientation that is aligned with the common reference coordinate system (100); and the subsequent measurements of the head sensor (111) can be calibrated as being relative to the reference orientation.

After the measurements of the sensor devices (111-119) are calibrated to measure relative to the common reference coordinate system (100), the hands, arms (105, 103), the head (107) and the torso (101) of the user may move relative to each other and relative to the coordinate system (100). The measurements of the sensor devices (111-119) provide orientations of the hands (106 and 108), the upper arms (105, 103), and the head (107) of the user relative to the common coordinate system (100).

In some implementations, each of the sensor devices (111-119) communicates its measurements directly to the computing device (141) in a way independent from the operations of other sensor devices.

Alternative, one of the sensor devices (111-119) may function as a base unit that receives measurements from one or more other sensor devices and transmit the bundled and/or combined measurements to the computing device (141).

Preferably, wireless connections made via a personal area wireless network (e.g., Bluetooth connections), or a local area wireless network (e.g., Wi-Fi connections) are used to facilitate the communication from the sensor devices (111-119) to the computing device (141).

Alternatively, wired connections can be are used to facilitate the communication among some of the sensor devices (111-119) and/or with the computing device (141).

For example, a hand module (117 or 119) attached to or held in a corresponding hand (106 or 108) of the user may receive the motion measurements of a corresponding arm module (115 or 113) and transmit the motion measurements of the corresponding hand (106 or 108) and the corresponding upper arm (105 or 103) to the computing device (141).

For example, the hand modules (117 and 119) and the arm modules (115 and 113) can be each respectively implemented via a base unit (or a game controller) and an arm/shoulder module discussed in U.S. patent application Ser. No. 15/492,915, filed Apr. 20, 2017 and entitled "Devices for Controlling Computers based on Motions and Positions of Hands", the entire disclosure of which application is hereby incorporated herein by reference.

In some implementations, the head module (111) is configured as a base unit that receives the motion measurements from the hand modules (117 and 119) and the arm modules (115 and 113) and bundles the measurement data for transmission to the computing device (141). In some instances, the computing device (141) is implemented as part of the head module (111).

The head module (111) may further determine the orientation of the torso (101) from the orientation of the arm modules (115 and 113) and/or the orientation of the head module (111) and thus eliminates the need to attach a separate sensor device to the torso (101), as discussed in U.S. patent application Ser. No. 15/813,813, filed Nov. 15, 2017, the disclosure of which is hereby incorporated herein by reference.

For the determination of the orientation of the torso (101), the hand modules (117 and 119) are optional in the system illustrated in FIG. 1. Further, in some instances the head module (111) is not used, in the tracking of the orientation of the torso (101) of the user.

Optionally, the computing device (141), or a hand module (e.g., 117), may combine the measurements of the hand module (e.g., 117) and the measurements of the corresponding arm module (e.g., 115) to compute the orientation of the forearm connected between the hand (106) and the upper arm (105), in a way as disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

FIG. 4 illustrates a system to control computer operations according to one embodiment. For example, the system of FIG. 4 can be implemented via attaching the arm modules (115, 113) to the upper arms (105 and 103) respectively and optionally, the head module (111) to the head (107), in a way illustrated in FIGS. 1-3.

In FIG. 4, the head module (111) and the arm module (113) have micro-electromechanical system (MEMS) inertial measurement units (IMUs) (121 and 131) that measure motion parameters and determine orientations of the head (107) and the upper arm (103). Similarly, the hand module (119) may also have its IMU.

Each of the IMUs (131, 121) has a collection of sensor components that enable the determination of the movement, position and/or orientation of the respective IMU along a number of axes. Examples of the components are: a MEMS accelerometer that measures the projection of acceleration (the difference between the true acceleration of an object and the gravitational acceleration); a MEMS gyroscope that measures angular velocities; and a magnetometer that measures the magnitude and direction of a magnetic field at a certain point in space. In some embodiments, the IMUs use a combination of sensors in three and two axes (e.g., without a magnetometer).

The computing device (141) has a motion processor (145), which includes a skeleton model (143) of the user (e.g., illustrated FIG. 6). The motion processor (145) controls the movements of the corresponding parts of the skeleton model (143) according to the movements/orientations of the upper arms (103 and 105) measured by the arm modules (113 and 115), the movements/orientation of the head (107) measured by the head module (111), the movements/orientations of the hand (106 and 108) measured by the hand modules (117 and 119), etc.

The skeleton model (143) is controlled by the motion processor (145) to generate inputs for an application (147) running in the computing device (141). For example, the skeleton model (143) can be used to control the movement of an avatar/model of the arms (105 and 103), the hands (106 and 108), the head (107), and the torso (101) of the user of the computing device (141) in a video game, a virtual reality, a mixed reality, or augmented reality, etc.

Preferably, the arm module (113) has a microcontroller (139) to process the sensor signals from the IMU (131) of the arm module (113) and a communication module (133) to transmit the motion/orientation parameters of the arm module (113) to the computing device (141). Similarly, the head module (111) has a microcontroller (129) to process the sensor signals from the IMU (121) of the head module (111) and a communication module (123) to transmit the motion/orientation parameters of the head module (111) to the computing device (141).

Optionally, the arm module (113) and the head module (111) have LED indicators (137 and 127) respectively to indicate the operating status of the modules (113 and 111).

Optionally, the arm module (113) has a haptic actuator (138) respectively to provide haptic feedback to the user.

Optionally, the head module (111) has a display device (127) and/or buttons and other input devices (125), such as a touch sensor, a microphone, a camera, etc.

In some implementations, the head module (111) is replaced with a module that is similar to the arm module (113) and that is attached to the head (107) via a strap or is secured to a head mounted display device.

In some applications, the hand module (119) can be implemented with a module that is similar to the arm module (113) and attached to the hand via holding or via a strap. Optionally, the hand module (119) has buttons and other input devices, such as a touch sensor, a joystick, etc.

For example, the handheld modules disclosed in U.S. patent application Ser. No. 15/792,255, filed Oct. 24, 2017 and entitled "Tracking Finger Movements to Generate Inputs for Computer Systems", U.S. patent application Ser. No. 15/787,555, filed Oct. 18, 2017 and entitled "Tracking Arm Movements to Generate Inputs for Computer Systems", and/or U.S. patent application Ser. No. 15/492,915, filed Apr. 20, 2017 and entitled "Devices for Controlling Computers based on Motions and Positions of Hands" can be used to implement the hand modules (117 and 119), the entire disclosures of which applications are hereby incorporated herein by reference.

FIG. 4 shows a hand module (119) and an arm module (113) as examples. An application for the tracking of the orientation of the torso (101) typically uses two arm modules (113 and 115) as illustrated in FIG. 1. The head module (111) can be used optionally to further improve the tracking of the orientation of the torso (101). Hand modules (117 and 119) can be further used to provide additional inputs and/or for the prediction/calculation of the orientations of the forearms of the user.

Typically, an IMU (e.g., 131 or 121) in a module (e.g., 113 or 111) generates acceleration data from accelerometers, angular velocity data from gyrometers/gyroscopes, and/or orientation data from magnetometers. The microcontrollers (139 and 129) perform preprocessing tasks, such as filtering the sensor data (e.g., blocking sensors that are not used in a specific application), applying calibration data (e.g., to correct the average accumulated error computed by the computing device (141)), transforming motion/position/orientation data in three axes into a quaternion, and packaging the preprocessed results into data packets (e.g., using a data compression technique) for transmitting to the host computing device (141) with a reduced bandwidth requirement and/or communication time.

Each of the microcontrollers (129, 139) may include a memory storing instructions controlling the operations of the respective microcontroller (129 or 139) to perform primary processing of the sensor data from the IMU (121, 131) and control the operations of the communication module (123, 133), and/or other components, such as the LED indicator (137), the haptic actuator (138), buttons and other input devices (125), the display device (127), etc.

The computing device (141) may include one or more microprocessors and a memory storing instructions to implement the motion processor (145). The motion processor (145) may also be implemented via hardware, such as Application-Specific Integrated Circuit (ASIC) or Field-Programmable Gate Array (FPGA).

In some instances, one of the modules (111, 113, 115, 117, and/or 119) is configured as a primary input device; and the other module is configured as a secondary input device that is connected to the computing device (141) via the primary input device. A secondary input device may use the microprocessor of its connected primary input device to perform some of the preprocessing tasks. A module that communicates directly to the computing device (141) is consider a primary input device, even when the module does not have a secondary input device that is connected to the computing device via the primary input device.

In some instances, the computing device (141) specifies the types of input data requested, and the conditions and/or frequency of the input data; and the modules (111, 113, 115, 117, and/or 119) report the requested input data under the conditions and/or according to the frequency specified by the computing device (141). Different reporting frequencies can be specified for different types of input data (e.g., accelerometer measurements, gyroscope/gyrometer measurements, magnetometer measurements, position, orientation, velocity).

In general, the computing device (141) may be a data processing system, such as a mobile phone, a desktop computer, a laptop computer, a head mounted virtual reality display, a personal medial player, a tablet computer, etc.

After the initial calibration of the sensor devices (111-119) for alignment with the common coordinate system (100), the sensor devices (113-119) may move relative to the user. For example, the arm module (e.g., 115) may slip around the arm (105) of the user after a game in virtual reality or augmented reality implemented via the computing device (141). The sensor devices mounted on the arms of the user can be conveniently re-calibrated using a reference pose illustrated in FIG. 5.

FIG. 5 illustrates a pose of a user to calibrate inertial measurement units attached to the arms of a user. For example, the calibration pose of FIG. 5 can be used for recalibration after the sensor devices (111-119) are initially calibrated according to the reference poses of FIGS. 1-3 using the computing system illustrated in FIG. 4.

In FIG. 5, the user extends arms (103 and 105) and hands (106 and 108) straight in a horizontal plane XY. The hand modules (117 and 119) are in contact with each other. The arms (103 and 105) form small angles respectively with the front facing direction X. The left and right arms (103 and 105) and the left and right hands (106 and 108) are in positions symmetric with respect to the center alone the front facing direction X. The front facing direction of the torso (101) of the user aligns with the direction X. In some instances, the calibration pose of FIG. 5 defines an updated coordinate system (100) that may have rotated along the vertical axis Z by an angle from the initial coordinate system (100) at the time of the calibration pose of FIG. 1.

The orientations of the arm modules (103 and 105) at the pose of FIG. 5 can be used to calibrate the arm modules (103 and 105) for alignment with the common coordinate system (100), as further discussed below. The calibration corrects at least the twist or turn of the arm module (e.g., 115) around the arm (105) between the time of the initial calibration (e.g., calibrated according to the reference pose of FIG. 1) and the time of recalibration using the pose of FIG. 5.

Further, the direction $V_A$ (159) of the arm (105) in the updated coordinate system (100) aligned with the front facing direction of the torso (101) at the calibration pose of FIG. 5 can be computed from the shoulder width of the user, the arm length of the user, and the width of the hand module (117) and used to calibrate the orienation of the arm module (115) within the horizontal plane XY.

FIG. 6 illustrates a skeleton model for the calibration according to the user pose of FIG. 5. For example, the skeleton model of FIG. 6 can be used to compute the direction $V_A$ (159) of the arm (105) for calibration in the horizontal plane XY.

In FIG. 6, the skeleton model has a known shoulder width $L_S$ (155), a known arm length$_S$ (153), and a known width W (151) of the handheld device (117). Thus, the distance L (157) between the handheld device (117) and the torso (101), as well as the direction $V_A$ (159) of the arm (105) relative to the updated coordinate system (100), can be computed from the shoulder width $L_S$ (155), the arm length$_S$ (153), and the width of the handheld device (117).

The skeleton model of FIG. 6 illustrates an arm (e.g., 105) as one rigid unit. Alternatively, other skeleton models may include separate forearms and upper arms that are connected via elbow joints and that may move relative to each other. Further, a skeleton model may include the head (107) and/or other portions of the user.

Figure 7:
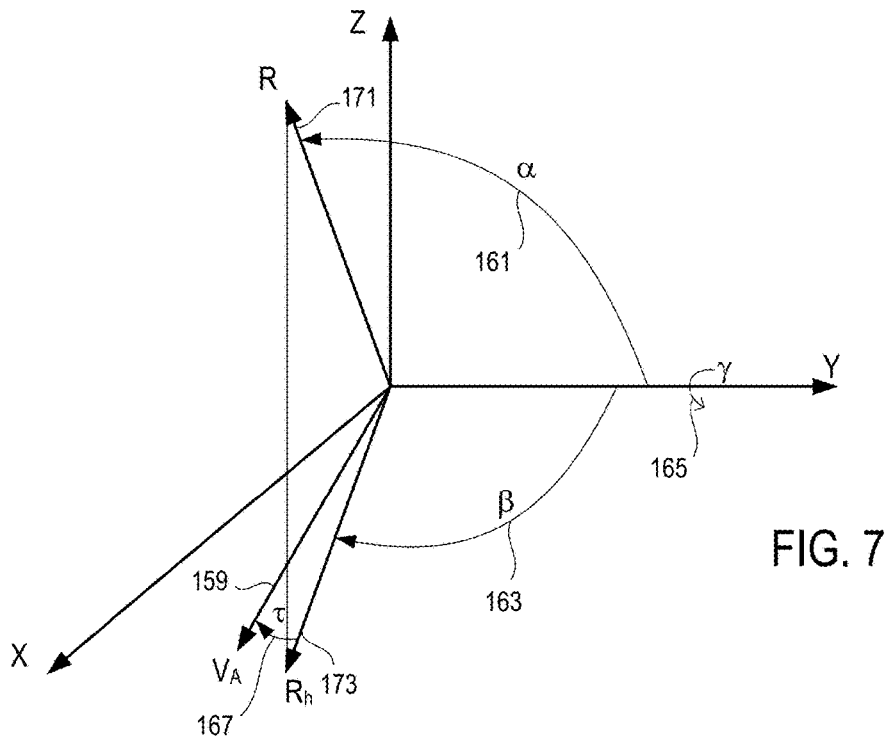
FIG. 7 illustrates the computation of rotational corrections calibrated according to the user pose of FIG. 5.

FIG. 7 illustrates the computation of rotational corrections calibrated according to the user pose of FIG. 5. For example, the computation of FIG. 7 can be performed in the computing system of FIG. 4 using the calibration pose of FIG. 5 and the skeleton model of FIG. 6, after the sensor devices (111-119) are initially calibrated for alignment with a common coordinate system (100) using the reference poses of FIGS. 1-3.

FIG. 7 illustrates a rotation γ (165) along the lengthwise direction of the arm (105) while the arm (105) is at the reference pose of FIG. 1 and a rotation τ within the horizontal plane XY along the direction Z.

The orientation change of the arm module (115) with respect to the common reference system (100) can be considered as the result of a rotation γ (165) around the arm (105) while the arm (105) is pointing along the direction Y and then a rotation (163) within the horizontal plane XY along the direction Z.

Thus, the rotation γ (165) can be computed by removing the rotation from the orientation change of the arm module (115) with respect to the common reference system (100).

For example, the rotational transformation of the arm module (115) as measured by the arm module (115) relative to the common reference system (100) can be applied, as a rotation α (161), to a unit direction that is initially along the direction Y to obtain the lengthwise direct R (171) of the arm (105) at the time of the calibration pose of FIG. 5. The projection of the lengthwise direct R (171) at the time of the calibration pose of FIG. 5, projected onto the horizontal plane XY along the direction Z, provides a direction $R_h$ that has a rotation β (163) within the horizontal plane XY to the direction Y. The angle of the rotation β (163) can be calculated as the rotation between the direction Y and the direction $R_h$. Reversing the rotation β (163) from the rotational transformation of the arm module (115) from the reference coordinate system (100) to the calibration pose of FIG. 5, as measured by the arm module (115), provides the rotation γ (165).

When the user moves the arm (105) from the reference pose of FIG. 1 to the calibration pose of FIG. 5, the arm (105) rotates along its lengthwise direction by a predetermined angle (e.g., 39 degrees). Thus, the difference between the calculated rotation γ (165) and the predetermined angle (e.g., 39 degrees) provides a desired correction (e.g., for a result of the arm module (115) slipping around the arm (105) after the initial calibration).

After calibrating the measurement of the arm module (115) to account for the slipping of the arm module (115) around the arm (105), it may be desirable to further recalibrate to account for the rotation of the torso (101) along the vertical direction, such that the front facing direction X as calibrated is aligned with the front facing direction of the torso (101) at the time of the calibration pose of FIG. 5.

Since the arm (105) is expected to be in the direction $V_A$ (159), the rotation τ (167), rotating in the horizontal plane XY along the direction Z from the direction $R_h$ (173) to the direction $V_A$ (159), can be applied to the orientation measurement of the arm module (115) such that the measurements of the arm module (115) is calibrated according to the new front facing direction identified by the torso (101) at the time of the calibration pose of FIG. 5.

The computation of the calibration parameters (e.g., γ (165) and τ (167)) can be performed in the computing device (141). Subsequently, the computing device (141) may apply the calibration parameters to the measurement results received from the sensor device (e.g., 115).

Alternatively, the computing device (141) may transmit the calibration parameters (e.g., γ (165) and τ (167)) to the sensor device (e.g., 115) that calibrates subsequent measurements relative to the common coordinate system (100) as defined by the calibration pose of FIG. 5.

In some implementations, the computing device (141) transmits the parameters used for the calibration calculation to the sensor device (e.g., 115), such as the direction $V_A$ in the new coordinate system (100) aligned with the calibration pose of FIG. 5, and/or the predetermined angle of rotation (e.g., 39 degrees) along the lengthwise direction when the arm (e.g., 105) is rotated from the reference pose of FIG. 1 to the calibration pose of FIG. 5. The sensor device (e.g., 115) calculates the calibration parameters (e.g., γ (165) and τ (167)) from its current orientation measurement upon an indication from the computing device (141) that the user is in the calibration pose of FIG. 5.

Figure 8:
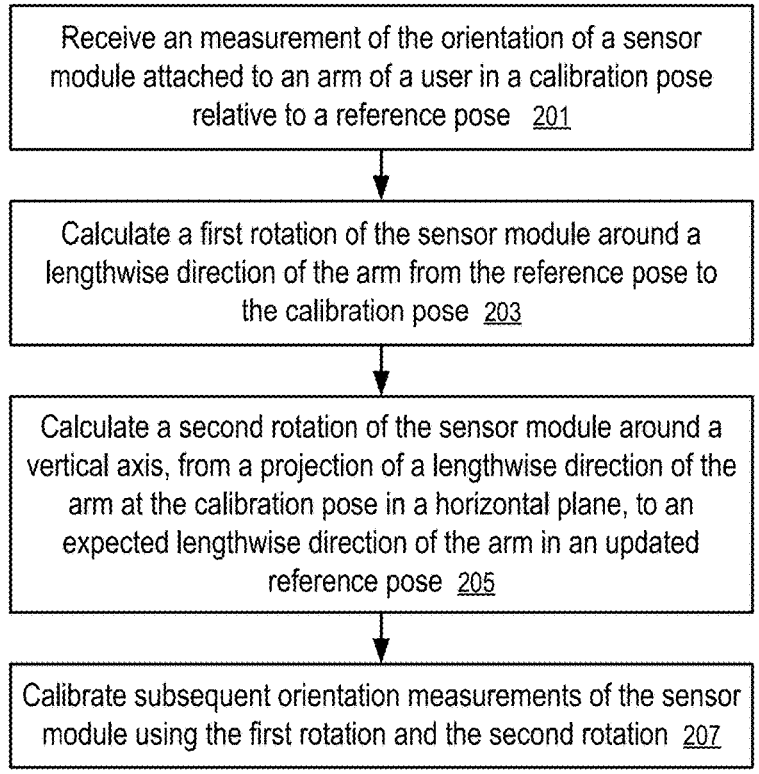
FIG. 8 shows a method to calibrate the orientation of an inertial measurement unit according to one embodiment.

FIG. 8 shows a method to calibrate the orientation of an inertial measurement unit according to one embodiment. For example, the method of FIG. 8 can be implemented in the computing system of FIG. 4 using a calibration pose of FIG. 5, the skeleton model of FIG. 6, and the rotation relations illustrated in FIG. 7, after a sensor device is calibrated using the reference poses of FIGS. 1-3.

The method of FIG. 8 includes: receiving (201) an measurement of the orientation of a sensor module (115) attached to an arm (105) of a user in a calibration pose (e.g., illustrated in FIG. 5) relative to a reference pose (e.g., illustrated in FIG. 1); calculating (203) a first rotation γ (165) of the sensor module (115) around a lengthwise direction of the arm (105) from the reference pose (e.g., illustrated in FIG. 1) to the calibration pose (e.g., illustrated in FIG. 5); calculating (205) a second rotation τ (167) of the sensor module (115) around a vertical axis Z, from a projection $R_h$ (173) of a lengthwise direction R (171) of the arm (115) at the calibration pose (e.g., illustrated in FIG. 5), projected in a horizontal plane XY, to an expected lengthwise direction $V_A$ (159) of the arm (105) in an updated reference pose (e.g., a pose obtained by rotating the arm (105) in the horizontal plane XY to the side, in parallel with the torso (101), to be in a pose similar to that illustrated in FIG. 1, without rotating the torso (101)); and calibrating (207) subsequent orientation measurements of the sensor module (115) using the first rotation γ (165) and the second rotation τ (167).

From the time of initial calibration with respect to the reference pose (e.g., illustrated in FIG. 1) and the time of recalibration at the calibration pose (e.g., illustrated in FIG. 5), the front facing direction of the torso (101) may have shifted by rotating along the vertical axis Z. Further, the sensor module (115) attached to the arm (105) via an armband may have slipped around the arm (105) about the lengthwise direction of the arm (105). The recalibration realigns the orientation measurement of the sensor module (115) with an updated reference coordinate system (101) that is aligned with respect to the update reference pose, without requiring the user to make the update reference pose for the recalibration. The update reference pose corresponds to the pose obtained by the user rotating the arm (105) from the calibration pose illustrated in FIG. 5 to a position where the lengthwise direction is in parallel with the torso (101) and is perpendicular to the front facing direction of the torso (101). The recalibration is performed relative to the update reference pose without requiring the user to actually make the update reference pose.

When the arm (105) rotates from the reference pose (e.g., illustrated in FIG. 1) to the calibration pose (e.g., illustrated in FIG. 5), the arm (105) rotates about its lengthwise direction by a predetermined angle (e.g., 39 degrees). The difference between the first rotation γ (165) and the rotation of the predetermined angle (e.g., 39 degrees) represents the slip of the sensor module (115) around the arm (105) from the time of the calibration according to the reference pose (e.g., illustrated in FIG. 1) and the time of the recalibration using the calibration pose (e.g., illustrated in FIG. 5). The slip can be removed from subsequent measurements. The second rotation τ (167) can be applied to the subsequent measurements so that the subsequent measurements are calibrated according to the front facing direction of the torso (101) at the time of the calibration pose (e.g., illustrated in FIG. 5).

Figure 9:
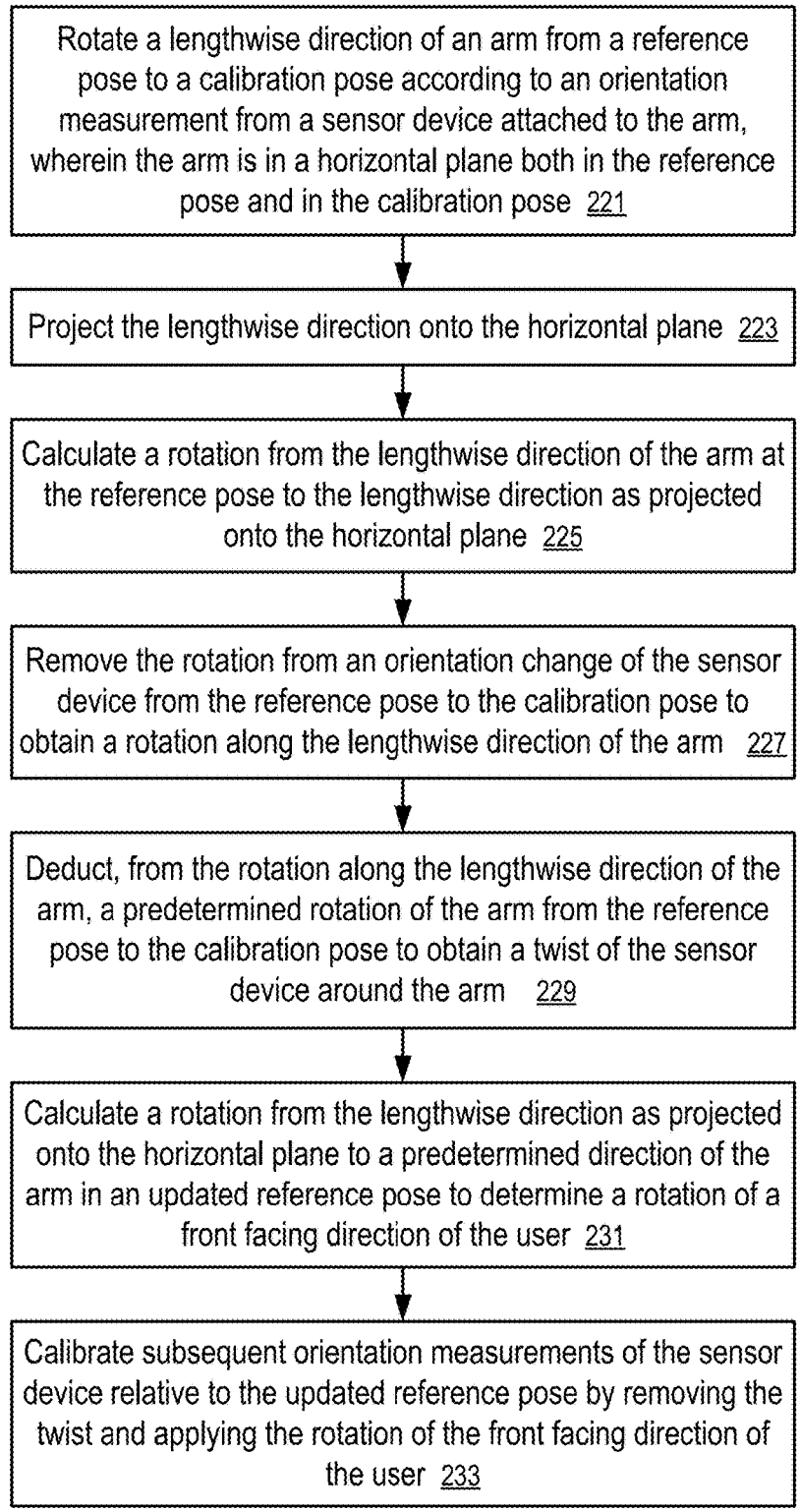
FIG. 9 shows a detailed method to perform calibration according to one embodiment.

FIG. 9 shows a detailed method to perform calibration according to one embodiment. For example, the method of FIG. 9 can be implemented in the computing system of FIG. 4 using a calibration pose of FIG. 5, the skeleton model of FIG. 6 and the rotation relations illustrated in FIG. 7, after a sensor device is calibrated using the reference poses of FIGS. 1-3.

The method of FIG. 9 includes: rotating (221) a lengthwise direction (e.g., parallel to the direction Y in FIG. 1 or 7) of an arm (105) from a reference pose (e.g., illustrated in FIG. 1) to a calibration pose (e.g., illustrated in FIG. 5) according to an orientation measurement from a sensor device (115) attached to the arm (105). The arm (105) is in a horizontal plane XY both in the reference pose (e.g., illustrated in FIG. 1) and in the calibration pose (e.g., illustrated in FIG. 5).

After the rotation α (161) according to the orientation measurement, the lengthwise direction of the arm (105) arrives at the direction R (171) illustrated in FIG. 7. The method of FIG. 9 further includes: projecting (223) the lengthwise direction R (171) onto the horizontal plane XY to obtain the direction $R_h$ (173) illustrated in FIG. 7; and calculating (225) a rotation β (163), from the lengthwise direction (e.g., parallel to the direction Y in FIG. 1 or 7) of the arm (105) at the reference pose (illustrated in FIG. 1), to the lengthwise direction $R_h$ (173) as projected onto the horizontal plane XY.

The method of FIG. 9 further includes: removing (227) the rotation β (163) from an orientation change of the sensor device (115) from the reference pose (e.g., illustrated in FIG. 1) to the calibration pose (e.g., illustrated in FIG. 5) to obtain a rotation γ (165) along the lengthwise direction of the arm (105); and deducting (229), from the rotation γ (165) along the lengthwise direction of the arm (105), a predetermined rotation of the arm (105) about its lengthwise direction from the reference pose (e.g., illustrated in FIG. 1) to the calibration pose (e.g., illustrated in FIG. 5) to obtain a twist of the sensor device (115) around the arm (e.g., from the time of the initial calibration according to the reference pose to the time of the calibration pose).

Optionally. the method of FIG. 9 further includes: calculating (231) a rotation τ (167), from the lengthwise direction $R_h$ (173) as projected onto the horizontal plane XY, to a predetermined direction $V_A$ (159) of the arm (105) in an updated reference pose (e.g., corresponding to the calibration pose of FIG. 5, by changing to a pose similar to the calibration pose of FIG. 1 through rotating the arms (103 and 105) without moving the torso (101)) to determine a rotation τ (167) of a front facing direction Y of the user from the time of the reference pose (illustrated in FIG. 1) to the time of the calibration pose (illustrated in FIG. 5).

The method of FIG. 9 further includes calibrating (233) subsequent orientation measurements of the sensor device (115) relative to the updated reference pose by removing the twist and optionally applying the rotation τ (167) of the front facing direction of the user.

The methods of FIGS. 8 and 9 can be implemented in the computing device (141) separate from the arm module (115), or implemented in the arm module (115). In some instances, the calibration parameters are calculated by the computing device (141) can be communicated to the arm module (115) for combination with subsequent measurements. In other implementations, a handheld device functions as a primary input device that calculates the calibration parameters and/or performs the calibration for the arm module (115) that functions as a secondary input device.

When the user is in the calibration pose illustrated in FIG. 5, it is also desirable to calibrate the orientation measurements of the head module (111).

Figure 10:
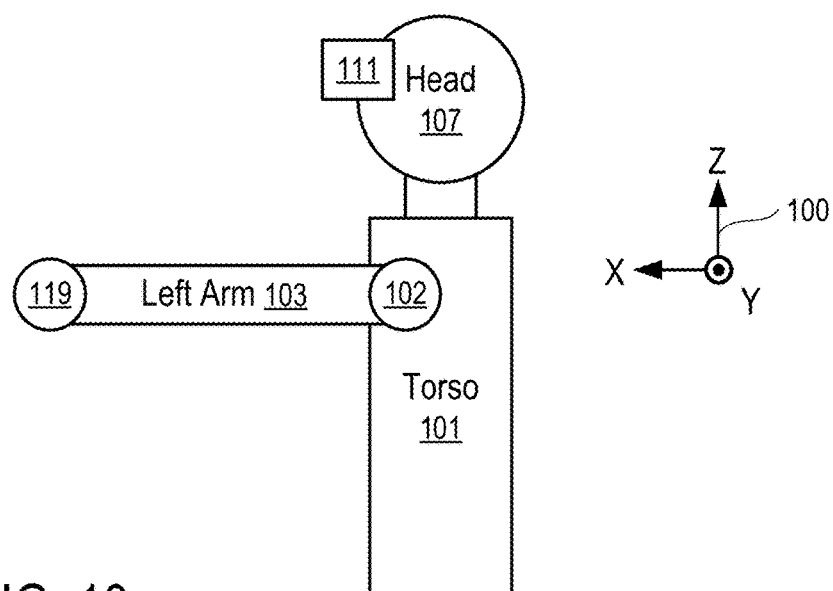
FIG. 10 shows a skeleton model for the calibration of a head mounted device using the calibration pose of FIG. 5.

FIG. 10 shows a skeleton model for the calibration of a head mounted device using the calibration pose of FIG. 5.

In FIG. 10, the arms (e.g., 103) of the user are in a horizontal plane XY. The head module (111) is above the horizontal plane containing the arms (e.g., 103) of the user and may or may not be aligned with the front facing direction X in general.

In one method for the calibration of the orientation measurements of the head module (111), a user is required to position the head module (111) that is mounted on the head (107) of the user such that the front facing direction of the head mounted device (111) is parallel with or in alignment with the global front facing direction X as defined by the directions of the arms (e.g., 103 and 105, as illustrated in FIGS. 5 and 6).

For example, the user may be instructed to look straight ahead horizontally in a horizontal plane such that the front facing direction of the head mounted device (111) is the same as the global front facing direction X at the calibration pose of FIG. 5. When the head module (111) is positioned in such a way at the calibration pose, the orientation measurement of the head mounted device (111) at the calibration pose relative to the reference pose (e.g., illustrated in FIG. 1) can be used to recalibrate the subsequent orientation measurements of the had module (111) according to the global reference system XYZ at the calibration pose of FIG. 5. Thus, the head module (111) and the arm modules (113 and 115) are all calibrated according to the same global reference system XYZ at the calibration pose of FIG. 5.

Figure 11:
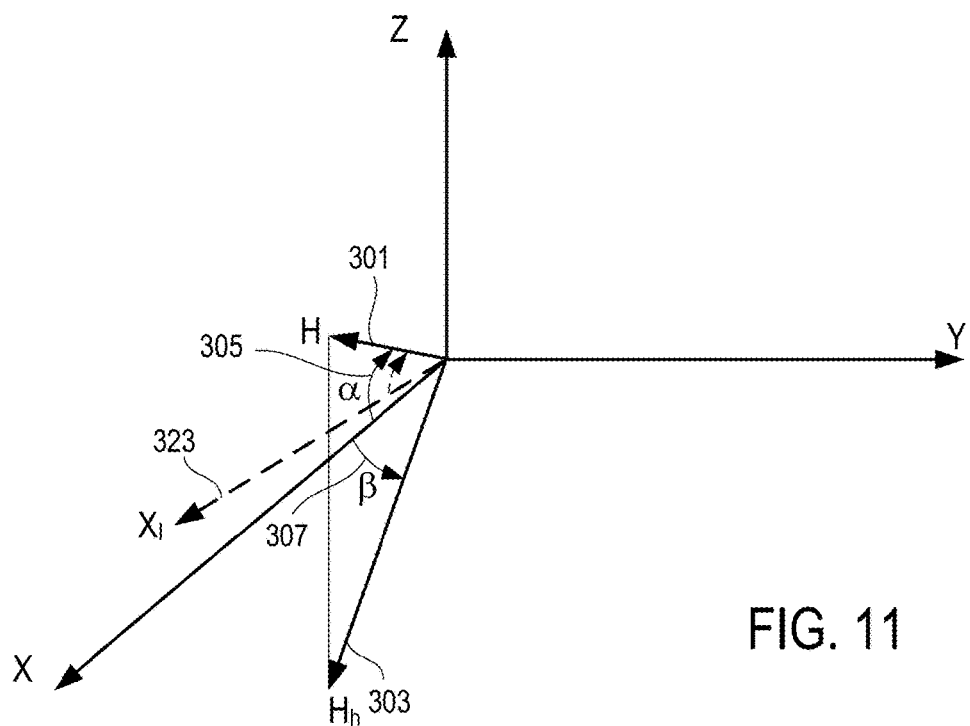
FIG. 11 illustrates the computation of a rotation for the calibration of the front facing direction of a head mounted device.

FIG. 11 illustrates the computation of a rotation for the calibration of the front facing direction of a head mounted device.

In FIG. 11, the front facing direction X at the global coordinate system of the reference system is rotated (305) to the direction H (301) according to the orientation measurement of the head module (111) at the calibration pose. Specifically, the orientation measurement of the head module (111) at the calibration pose relative to the reference pose defines a rotation α (305) that rotates the front facing direction X in the reference pose of FIG. 1 to the front facing direction H (301) in the calibration pose of FIG. 5.

To perform the calibration, the direction H (301) is projected on to the horizontal plane XY to obtain the projected direction $H_h$ (303).

From the projected direction $H_h$ (303), a rotation β (307) along the vertical direction Z from the front facing direction X in the reference pose of FIG. 1 to the projected direction $H_h$ (303) can be calculated for the calibration of subsequent orientation measurements of the head module (111). For example, when the rotation (307) is subtracted from the subsequent orientation measurements of the head module (111) for calibration, the calibrated orientation measurement is relative to the global front facing direction X at the calibration pose.

When the head module (111) includes a camera (or when the camera is attached to the head module (111), which may include a head mounted display (HMD)), a direction $X_I$ (323) of the head module (111) that is in alignment with the global front facing direction X at the calibration pose can be calculated from an image captured using the camera, as further discussed below. When the direction $X_I$ (323) can be determined using the camera, the user does not have to look straight ahead in a horizontal plane to position the head module (111) in such a way that the front facing direction of the head mounted device (111) is in alignment with the global front facing direction X. Since the direction $X_I$ (323) is in alignment with the global front facing direction X, the rotational transformation of the head module (111) from the reference pose to the calibration pose can be applied to the direction $X_I$ (323) to obtain the direction H (301) that faces the front direction. It's projection direction $H_h$ (303) in the horizontal plane defines the rotation β (307) from the direction X. Thus, the correctional rotation β (307) can be determined with the use of the camera without requiring the user to position the head module (111) in a precise orientation where the front facing direction of the head module (111) is in alignment with the global front facing direction X at the calibration pose (at least in the vertical plane that contains the global front facing direction X at the calibration pose).

Figure 12:
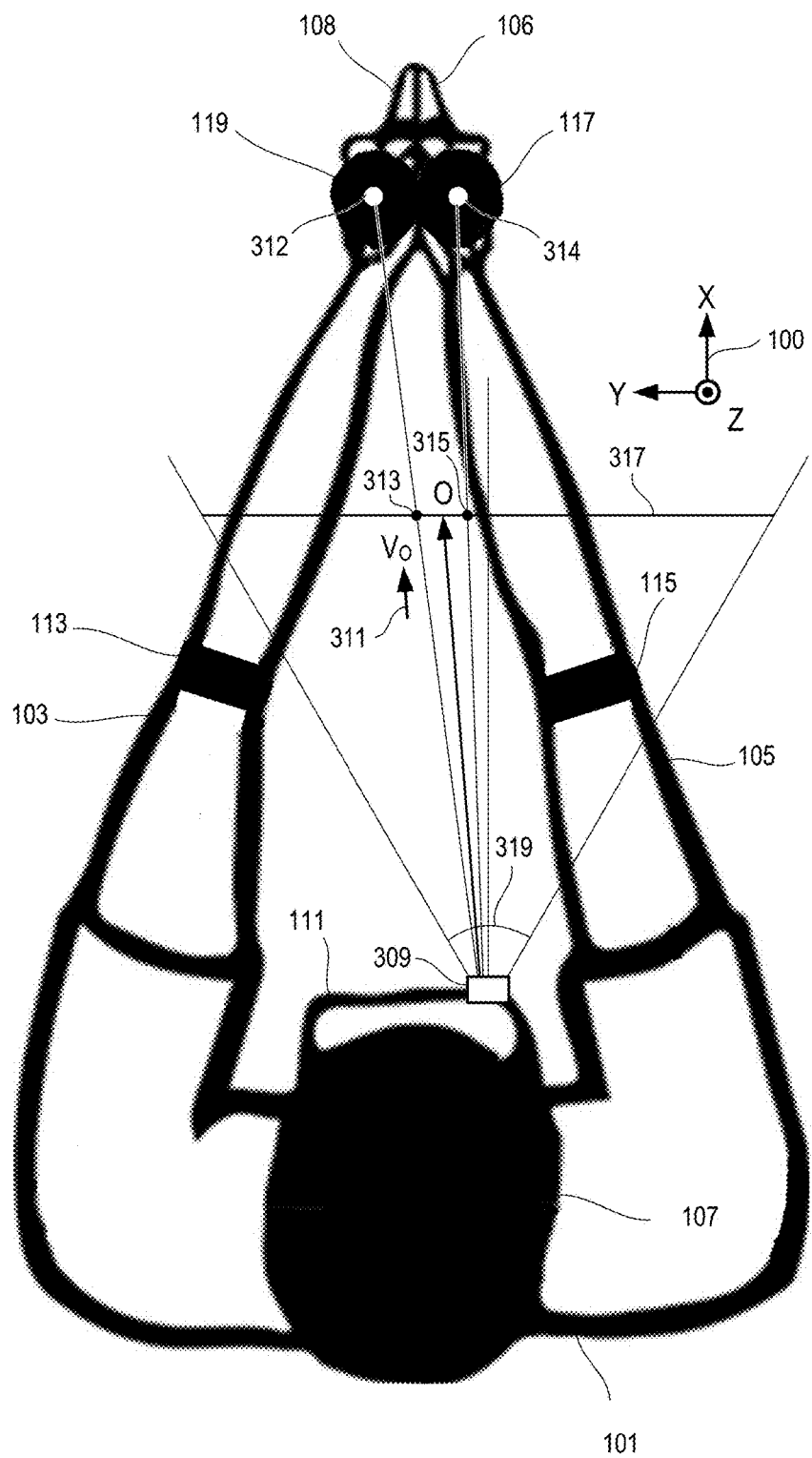
FIG. 12 illustrates the use of a camera for the calibration of the front facing direction of a head mounted device according to the user pose of FIG. 5.

FIG. 12 illustrates the use of a camera for the calibration of the front facing direction of a head mounted device according to the user pose of FIG. 5.

In FIG. 12, each of the handheld devices (117 and 119) has an optical mark (312 and 314) that can be captured and identified in an automated way in an image generated by a camera (309) (e.g., a camera included in the head module (111) or a camera attached to the head module (111), such as a head mounted display).

For example, the optical marks (312 and 314) may be implemented using Light-Emitting Diode (LED) lights (e.g., visible lights or infrared lights detectable via the camera (309)) installed on the handheld devices. The light-Emitting Diode (LED) lights are switched on when the handheld devices (117 and 119) are in use and/or when the user is in the calibration pose of FIG. 12 (or FIG. 5).

For example, the handheld devices (117 and 119) may include one or more buttons which, when activated, indicate that the user is in the calibration pose, which cause the light-Emitting Diode (LED) lights to be on and cause the camera (309) to capture an image for calibration.

For example, being in the calibration pose of FIG. 12 (or FIG. 5) for a time period longer than a threshold can be identified as a gesture for calibration. When the gesture is detected from the sensor modules (e.g., 113, 115, 117, and 119), the light-Emitting Diode (LED) lights are turned on to simplify the detection of their locations in the image(s) captured by the camera (309).

In some instances, the optical marks (312 and 314) may be inactive elements, such as decorative marks made of paints, stickers, a geometrical feature of the house of the handheld devices (117 and 119). In some instances, a pattern analysis of the captured image of the handheld devices (117 and 119) and/or the hands (106 and 108) of the user is performed to recognize the handheld devices (117 and 119) and/or the hands (106 and 108) and thus their locations in the image.

FIG. 12 illustrates the locations (313 and 315) of the optical marks (312 and 314) on the image (317) captured by the camera (309). A center point O can be identified from the optical marks (312 and 314). The direction $V_O$ (311) of the center point O relative to the camera (309) can be calculated from the field of view (319) of the camera, the relative position of the center point O on the image (317).

In general, the direction $V_O$ is not in parallel with the front facing direction of the camera (309) and is not in parallel with the front facing direction X of the global coordinate system XYZ (100) at the calibration pose of FIG. 12.

FIG. 12 illustrates an orientation of the camera (309), where the front facing direction of the head module (111) and the camera (309) is in parallel with (aligned with) the front facing direction X of the global coordinate system XYZ (100) (e.g., when the user looks straight ahead in the horizontal plane). In such a situation, the horizontal rotation of the front facing direction of the head module (111) and the camera (309) from the reference pose to the calibration pose identifies the rotational correction for the head module (111). For example, the orientation measurement of the head module (111) at the calibration pose provides a rotation transformation (305) from the reference pose to the calibration pose. When the rotation transformation (305) is applied to the front facing direction at the reference pose (e.g., illustrated in FIG. 1) to obtain the direction H (301) as illustrated in FIG. 11, its projection $H_h$ (303) defines a rotate β (307) from the front facing direction X at the calibration pose, which can be used to re-calibrate the subsequent orientation measurements relative to the front facing direction X of the global coordinate system (100) at the calibration pose of FIG. 12, as discussed above in connection with FIG. 11.

In general, the user may not look straight ahead in the horizontal plane. Thus, the center point of the optical marks (312 and 314) captured in the image (317) in general may not be at point O. Instead of at the direction $V_O$ (311), the center point of the optical marks (312 and 314) captured in the image (317) in general is at a direction $V_I$ (321) relative to the camera (309) (as illustrated in FIG. 13). The deviation of the direction $V_I$ (321) from the direction $V_O$ (311) can be used to identify a direction $X_I$ (323) that is in alignment with the front facing direction X of the global coordinate system (100) at the calibration pose of FIG. 12. In general, the direction $X_I$ (323) is not in alignment with the front facing direction of the camera (309). After the direction $X_I$ (323) is determined from the image (317) captured by the camera (309), applying the rotation transformation between the reference pose and the calibration pose to the direction $X_I$ (323) provides the direction H (301) illustrated in FIG. 11, the rotation correction β (307) from the front facing direction X at the reference pose can be determined from its projection $H_h$ (303) in the horizontal plan XY, as illustrated in FIG. 11, without requiring the user to look straight ahead in the horizontal plane.

FIG. 13 illustrates the determination of a direction $X_I$ (323) from a camera image captured at a calibration pose of FIG. 12 or FIG. 5 for the calibration of the front facing direction of a head mounted device (111).

In FIG. 13, when the front facing direction x of the camera (309) and the head module (111) is aligned with the global front facing direction X (e.g., as in FIG. 12), the direction $V_O$ (311) of the center O of the optical marks (312, 314) captured by the camera (309) in the image (317) has a rotational offset ω (322) from the front facing direction x (e.g., as in FIG. 12).

When the camera (309) is rotated to capture the center O of the optical marks (312, 314) at the direction $V_I$ (321), the direction $X_I$ (323) is in alignment with the global front facing direction X. As illustrated in FIG. 13, the direction $X_I$ (323) has the same rotational offset ω (322/324) from the direction $V_I$ (321). Thus, the direction $X_I$ (323) can be calculated by applying the rotational offset ω (322/324) to the direction $V_I$ (321). Alternatively, the rotation (326) from the direction $V_O$ (311) to the direction $V_I$ (321) can be applied (325) to the front facing direction x of the camera (309) to obtain the direction $X_I$ (323).

FIG. 13 illustrates the camera rotation (325 or 326) in the horizontal plane where the user at the calibration pose looks in the horizontal plane but does not look exactly straight ahead. In general, the user may also look down at the optical marks (312 and 314) and thus does not look in the horizontal plane. In such a situation the camera rotation from the direction $V_O$ to the direction $V_I$ may include a rotation out of the horizontal plane. The determination of the direction $X_I$ (323) can be performed by applying the rotational offset ω (322) to the direction $V_I$ (321), or applying the rotation (326) to the front facing direction x, in the same way as illustrated in FIG. 13.

The offset ω (322) can be calculated from the coordinate offsets of the center point O in the local coordinate system of the camera (309) at a time the local coordinate system of the camera (309) is aligned with the global coordinate system XYZ (100) as illustrated in FIG. 12. For example, the coordinate offsets include the vertical offset between the camera (309) and the horizontal plane that goes through the center O at the calibration pose, the lateral offset between the camera (309) and a vertical plane that goes through the center of the user at the calibration pose and the center O, and the frontal offset between the camera (309) and a vertical plane that is perpendicular to the global front facing direction X and goes through the center O.

Since the direction $X_I$ (323) is aligned with the direction X of the global coordinate system XYZ (100) at the time of the calibration pose (e.g., as illustrated in FIG. 5 or 12), the orientation transformation measured at the calibration pose relative to the reference pose (e.g., as illustrated in FIG. 1) can be applied to the direction $X_I$ (323) at the reference pose to obtain the direction H (301) illustrated in FIG. 11. A correction according to the rotation β (307) between the direction X and the projection $H_h$ (303) as illustrated in FIG. 11 can be applied to the subsequent orientation measurements of the head module (111) such that the calibrated measurements are relative to the global coordinate system XYZ (100) defined at the time of the calibration pose (e.g., illustrated in FIG. 5 or 15).

FIG. 14 shows a method to calibrate the front facing direction of a head mounted device according to one embodiment. For example, the method of FIG. 14 can be implemented in a system illustrated in FIG. 4, using a calibration pose illustrated in FIG. 5 or 12 relative to a reference pose illustrated in FIG. 1 and a skeleton model of FIG. 10, in accordance with the rotational offset illustrated in FIG. 13.

The method of FIG. 14 includes: receiving (331) an measurement of the orientation of a sensor module (111) attached to a head mounted device (111) of a user in a calibration pose (e.g., illustrated in FIG. 5 or FIG. 12) relative to a reference pose (e.g., illustrated in FIG. 1); identifying (333) a first direction $X_I$ (323) of the sensor module (111) in the reference pose (e.g., illustrated in FIG. 1) that is expected to be rotated to a front facing direction X of the global coordinate system (100) at the calibration pose (e.g., illustrated in FIG. 5 or FIG. 12); applying (335) a first rotation α (305), identified by the measurement of the orientation of the sensor module (111), to the first direction $X_I$ (323) to obtain a second direction H (301) of the sensor module (121) at the calibration pose (e.g., illustrated in FIG. 5 or 12) relative to the reference pose (e.g., illustrated in FIG. 1); determining (337) a second rotation β (307) between the front facing direction X at the reference pose (e.g., illustrated in FIG. 1) and a projection $H_h$ (303) of the second direction H (301) in a horizontal plane XY; and calibrating (339) subsequent orientation measurements of the sensor module (121) using the second rotation β (307).

When the user is instructed to look straight ahead in the horizontal plane at the calibration pose (e.g. as illustrated in FIG. 12), the first direction $X_I$ (323) can be identified based on the front facing direction X at the time of the calibration post (e.g., illustrated in FIG. 1).

When the head mounted device (111) has a camera (309) as illustrated in FIG. 12, it is not necessary to instruct the user to look straight ahead in the horizontal plane at the calibration pose. For example, the user may look down into the optical marks (312, 314) with or without a rotation along the vertical axis Z. In such a configuration, the first direction $X_I$ (323) can be computed from the image (317) of the optical marks (312 and 314) captured by the camera (309) at the time of the calibration pose (e.g., illustrated in FIG. 12), using the relations illustrated in FIG. 13.

Figure 15:
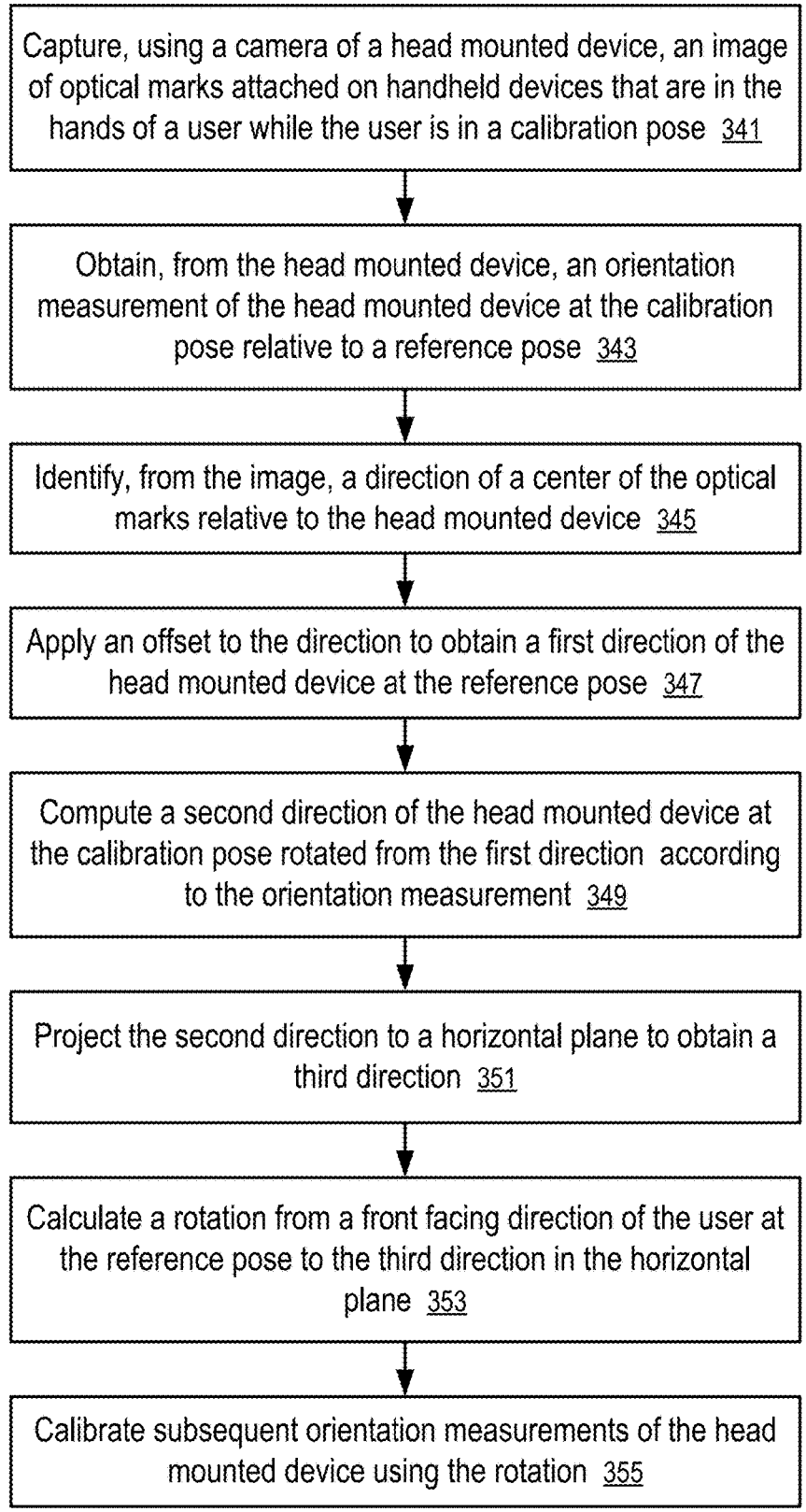
FIG. 15 shows a detailed method to calibrate the front facing direction of a head mounted device according to one embodiment.

FIG. 15 shows a detailed method to calibrate the front facing direction of a head mounted device according to one embodiment. For example, the method of FIG. 15 can be implemented in a system illustrated in FIG. 4, using a calibration pose illustrated in FIG. 5 or 12 relative to a reference pose illustrated in FIG. 1 and a skeleton model of FIG. 10, in accordance with the rotational offset illustrated in FIG. 13.

The method of FIG. 15 includes: capturing (341), using a camera (309) of a head mounted device (111), an image (317) of optical marks (312 and 314) attached on handheld devices (117 and 119) that are in the hands of a user while the user is in a calibration pose (e.g., illustrated in FIG. 12); obtaining (343), from the head mounted device (111), an orientation measurement of the head mounted device (111) at the calibration pose (e.g., illustrated in FIG. 12) relative to a reference pose (e.g., illustrated in FIG. 12); identifying (345), from the image (317), a direction $V_I$ (321) of a center O of the optical marks relative to the head mounted device (111); applying (347) an offset ω (324) to the direction $V_I$ (321) to obtain a first direction $X_I$ (323) of the head mounted device (111) at the reference pose (e.g., illustrated in FIG. 12); computing (349) a second direction H (301) of the head mounted device (111) at the calibration pose (e.g., illustrated in FIG. 1) that is rotated by an angle α (305) from the first direction $X_I$ (323) according to the orientation measurement; projecting (351) the second direction H (301) to a horizontal plane XY to obtain a third direction $H_h$ (303); calculating (353) a rotation (307) from a front facing direction X of the user at the reference pose (e.g., illustrated in FIG. 1) to the third direction $H_h$ (303) in the horizontal plane XY; and calibrating (355) subsequent orientation measurements of the head mounted device (111) using the rotation β (307).

The present disclosure includes a system that has a sensor module (111) having an inertial measurement unit (121) and attached to a head (107) of a user, and a computing device (e.g., 141) coupled to the sensor module (111). The computing device (141) may be separate from the sensor module (111), as illustrated in FIG. 4, or be part of the sensor module (111). In some instances, the sensor module (111) is a head mounted display device with a camera (309).

The sensor module (111) generates a measurement of an orientation of the head (107) at a calibration pose (e.g., illustrated in FIG. 5 or 12) relative to a reference pose (e.g., illustrated in FIG. 1). The computing device (141) is configured to: apply a first rotation (e.g., α (305)), defined by the measurement of the orientation of the head at the calibration pose relative to the reference pose, to a first direction (e.g., X or $X_I$) relative to the head at the reference pose to obtain a second direction H (301) relative to the reference pose; project the second direction H (301) on to a horizontal plane XY to obtain a projected direction $H_h$ (303) within the horizontal plane XY relative to the reference pose; compute a second rotation β (307) between the projected direction $H_h$ (303) and a predetermined direction X of the head (107) relative to the reference pose; and calibrate subsequent orientation measurements of the sensor module (111) using the second rotation β (307).

For example, at the calibration pose as illustrated in FIG. 5 or 12, arms (103 and 105) of the user are in a horizontal plane XY to form predetermined angles with respect to a front facing direction X of a torso of the user at the calibration pose; and at the reference pose as illustrated in FIG. 1, the arms (103 and 105) are in the horizontal plane and are perpendicular to a front facing direction X of the torso of the user at the reference pose. When the calibration is subsequently re-performed, the previously performed calibration pose becomes the reference pose for the subsequent calibration.

The user may be instructed to look straight ahead horizontally; and in such a situation, the first direction (e.g., X or $X_I$) is a front facing direction X at the reference pose.

When the sensor module (111) is a head mounted device having a camera (309), it is not necessary for the user to look straight ahead horizontally at the calibration pose. The first direction $X_I$ (323) can be determined from an image (317) captured by the camera (309) at the calibration pose.

For example, the image (317) captures at least one optical mark (e.g., 312, 314) positioned in front of the user at the calibration pose (e.g., illustrated in FIG. 12); and the first direction $X_I$ (323) is determined based on a direction $V_I$ (321) of the at least one optical mark (e.g., 312, 314) relative to the camera (309) at the calibration pose.

As illustrated in FIG. 13, the computing device may apply a predetermined offset ω (322/324) to the direction $V_I$ (321) of the at least one optical mark (e.g. 312, 314) relative to the camera (309) to obtain the first direction $X_I$ (323). The predetermined offset ω (322/324) is equal to an offset, at a time when the user looks straight ahead horizontally, between a direction $V_O$ (311) of the at least one optical mark relative to the camera (309) and a front facing direction X or x.

Alternatively, as illustrated in FIG. 13, the computing device may compute a rotation offset (326), from a direction $V_I$ (321) of the at least one optical mark (312 and 314) relative to the camera (309) at the calibration pose, to a direction $V_O$ (311) of the at least one optical mark (312 and 314) relative to the camera (309) when a front facing direction x of the sensor module is in parallel with a front facing direction X of a torso (101) of the user at the calibration pose. Then, the first direction $X_I$ (323) can be computed based on the rotation offset (326) by applying the equal rotation offset (325) to the front facing direction x of the sensor module (111).

For example, two handheld devices (117 and 119) having inertial measurement units can be used to measure orientations of hands (106 and 108) of the user. The at least one optical mark (312 and 314) can be configured on the two handheld devices (e.g., 117 and 119) as LED lights, painted marks, structure features, etc. The calibration pose may be detected based on one or more user input generated using the handheld devices (117 and 119), such as button clicks, touch inputs, joystick inputs.

In some instances, two arm modules (113 and 115) having inertial measurement units (e.g., 131) are also used to measure orientations of the arms (103 and 105) of the user. The calibration pose can be detected based on a gesture determined using orientation measurements of the arm modules (103 and 105) and/or the handheld devices (117 and 119).

The sensor module (111) may include a communication device (123) for a communication link with the computing device (141). The inertial measurement unit (121) of the sensor module (111) may include a micro-electromechanical system (MEMS) gyroscope, a magnetometer, and/or a MEMS accelerometer.

The present disclosure includes methods and apparatuses which perform these methods, including data processing systems which perform these methods, and computer readable media containing instructions which when executed on data processing systems cause the systems to perform these methods.

For example, the computing device (141), the handheld devices (117 and 119), the arm modules (113, 115), and/or the head module (111) can be implemented using one or more data processing systems.

A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
   a sensor module having an inertial measurement unit and attached to a head of a user, the sensor module configured to generate a measurement of an orientation of the head at a calibration pose relative to a reference pose; and
   a computing device coupled to the sensor module, the computing device configured to:
     apply a first rotation, defined by the measurement of the orientation of the head at the calibration pose relative to the reference pose, to a first direction relative to the head at the reference pose to obtain a second direction relative to the reference pose;
     project the second direction on to a horizontal plane to obtain a projected direction within the horizontal plane relative to the reference pose;
     compute a second rotation between the projected direction and a predetermined direction of the head relative to the reference pose; and
     calibrate, using the second rotation, subsequent orientation measurements of the sensor module;
   wherein:
     at the calibration pose, arms of the user are in a horizontal plane to form a predetermined angle with respect to a front facing direction of a torso of the user at the calibration pose; and
     at the reference pose, the arms are in the horizontal plane and are perpendicular to a front facing direction of the torso of the user at the reference pose.

2. The system of claim 1, wherein the user is instructed to look straight ahead horizontally; and the first direction is a front facing direction at the reference pose.

3. The system of claim 1, wherein the sensor module is a head mounted device having a camera; and the first direction is determined from an image captured by the camera at the calibration pose.

4. The system of claim 3, wherein the image captures at least one optical mark in front of the user at the calibration pose; and the first direction is determined based on a direction of the at least one optical mark relative to the camera at the calibration pose.

5. The system of claim 4, wherein the computing device is configured to apply a predetermined offset to the direction of the at least one optical mark relative to the camera to obtain the first direction.

6. The system of claim 5, wherein the predetermined offset is equal to an offset, at a time when the user looks straight ahead horizontally, between a direction of the at least one optical mark relative to the camera and a front facing direction.

7. The system of claim 3, wherein the computing device is configured to compute a rotation offset:
   from a direction of the at least one optical mark relative to the camera at the calibration pose,
   to a direction of the at least one optical mark relative to the camera when a front facing direction of the sensor module is in parallel with a front facing direction of a torso of the user at the calibration pose;
   wherein the first direction is computed based on the rotation offset.

8. The system of claim 7, wherein the computing device is configured to apply the rotation offset to the front facing direction of the sensor module to obtain the first direction.

9. The system of claim 4, further comprising:
two handheld devices having inertial measurement units configured to measure orientations of hands of the user;
wherein the at least one optical mark is configured on the two handheld devices.

10. A system, comprising:
a sensor module having an inertial measurement unit and attached to a head of a user, the sensor module configured to generate a measurement of an orientation of the head at a calibration pose relative to a reference pose; and
a computing device coupled to the sensor module, the computing device configured to:
apply a first rotation, defined by the measurement of the orientation of the head at the calibration pose relative to the reference pose, to a first direction relative to the head at the reference pose to obtain a second direction relative to the reference pose;
project the second direction on to a horizontal plane to obtain a projected direction within the horizontal plane relative to the reference pose;
compute a second rotation between the projected direction and a predetermined direction of the head relative to the reference pose; and
calibrate, using the second rotation, subsequent orientation measurements of the sensor module;
two handheld devices having inertial measurement units configured to measure orientations of hands of the user; and
two arm modules having inertial measurement units configured to measure orientations of arms of the user;
wherein the calibration pose is detected based on a gesture determined using orientation measurements of the arm modules and the handheld devices.

11. The system of claim 9, wherein the calibration pose is detected based on one or more user input generated using the handheld devices.

12. The system of claim 10, wherein the sensor module includes a communication device for a communication link with the computing device.

13. The system of claim 10, wherein the inertial measurement unit includes a micro-electromechanical system (MEMS) gyroscope.

14. The system of claim 13, wherein the inertial measurement unit further includes a magnetometer and a MEMS accelerometer.

15. A method, comprising:
receiving, from a sensor module having an inertial measurement unit and attached to a head of a user, a measurement of an orientation of the head at a calibration pose relative to a reference pose;
capturing, from a camera of the sensor module, an image of at least one optical mark at the calibration pose;
identifying, from the image, a first direction relative to the head at the reference pose;
applying a first rotation, according to the measurement of the orientation of the head at the calibration pose relative to the initial reference pose, to a first direction to obtain a second direction;
projecting the second direction on to a horizontal plane as a projected direction within the horizontal plane relative to the initial reference pose;
computing a second rotation between the projected direction and a predetermined direction of the head relative to the initial reference pose; and
calibrating, using the second rotation, subsequent orientation measurements of the sensor module;
wherein:
at the calibration pose, arms of the user are in a horizontal plane to form a predetermined angle with respect to a front facing direction of a torso of the user at the calibration pose; and
at the reference pose, the arms are in the horizontal plane and are perpendicular to a front facing direction of the torso of the user at the reference pose.

16. The method of claim 15, further comprising:
computing, from the image, a direction of a center of the at least one optical mark relative to the camera at the calibration pose;
wherein the first direction relative to the head at the reference pose is computed based on the direction of the center of the at least one optical mark.

17. The method of claim 16, wherein the first direction is calculated by applying a predetermined offset to the direction of the center of the at least one optical mark.

18. The method of claim 16, wherein the first direction is calculated by applying, to a front facing direction of the head, a rotation between:
the direction of the center of the at least one optical mark at the calibration pose, and a reference direction of the center of the at least one optical mark.

19. A non-transitory computer storage medium storing instructions which, when executed by a computing device, instructs the computing device to perform a method, the method comprising:
receiving, from a sensor module having an inertial measurement unit and attached to a head of a user, a measurement of an orientation of the head at a calibration pose relative to a reference pose;
capturing, from a camera of the sensor module, an image of at least one optical mark at the calibration pose;
identifying, from the image, a first direction relative to the head at the reference pose;
applying a first rotation, according to the measurement of the orientation of the head at the calibration pose relative to the initial reference pose, to a first direction to obtain a second direction;
projecting the second direction on to a horizontal plane as a projected direction within the horizontal plane relative to the initial reference pose;
computing a second rotation between the projected direction and a predetermined direction of the head relative to the initial reference pose; and
calibrating, using the second rotation, subsequent orientation measurements of the sensor module;
wherein the calibration pose is detected based on a gesture determined using orientation measurements of two arm modules having inertial measurement units configured to measure orientations of hands of the user.

20. The non-transitory computer storage medium of claim 19, wherein the gesture is determined further using orientation measurements of two handheld devices having inertial measurement units configured to measure orientations of hands of the user.

* * * * *